United States Patent [19]

Ando

[11] Patent Number: 5,107,101
[45] Date of Patent: Apr. 21, 1992

[54] OPTICAL INFORMATION PROCESSING APPARATUS WITH PEAK HOLD CIRCUIT FOR GAIN CONTROL SIGNAL

[75] Inventor: Hirotake Ando, Tokyo, Japan
[73] Assignee: Canon Kabushiki Kaisha, Tokyo, Japan
[21] Appl. No.: 643,710
[22] Filed: Jan. 22, 1991

Related U.S. Application Data

[63] Continuation of Ser. No. 317,925, Mar. 2, 1989, abandoned.

[30] Foreign Application Priority Data

Mar. 2, 1988 [JP] Japan .................. 63-047494

[51] Int. Cl.⁵ .............................................. G01J 1/20
[52] U.S. Cl. ...................... 250/201.5; 369/44.31; 369/44.36
[58] Field of Search ......... 250/201 R, 201 DF, 201.1, 250/201.2, 201.5; 369/44–46, 44.31, 44.29, 44.36

[56] References Cited

U.S. PATENT DOCUMENTS

| | | | |
|---|---|---|---|
| 4,079,247 | 3/1978 | Bricot et al. | |
| 4,410,969 | 10/1983 | Maeda. | |
| 4,611,317 | 9/1986 | Takeuchi et al. | 369/45 |
| 4,683,560 | 7/1987 | Takeuchi et al. | 369/45 |
| 4,701,603 | 10/1987 | Dakin et al. | 369/45 |
| 4,736,354 | 4/1988 | Yoshio | 369/45 |
| 4,769,801 | 9/1988 | Funada et al. | 369/45 |
| 4,878,211 | 10/1989 | Suzuki et al. | 369/45 |

Primary Examiner—David C. Nelms
Assistant Examiner—K Shami
Attorney, Agent, or Firm—Fitzpatrick, Cella, Harper & Scinto

[57] ABSTRACT

A peak hold circuit for a gain control signal is disclosed for use with an apparatus for recording information on and/or reproducing information from an optical recording medium by scanning the optical recording medium with a condensed light beam. The apparatus includes an adjusting device for adjusting a focusing and/or tracking condition of the light beam, an error detecting device for detecting a focusing error signal and/or a tracking error signal from light of the light beam reflected or transmitted by the optical recording medium, a feedback control circuit for feeding back an output from the error detecting device to the adjusting device, a light quantity detecting device for detecting light quantity of the reflected or transmitted light, a gain control device for controlling gain of the feedback control circuit in accordance with the output of the light quantity detecting device, and a switching device for selectively switching the ouput of the light quantity detecting device to a hold condition or to a through condition.

33 Claims, 5 Drawing Sheets

OPTICAL INFORMATION PROCESSING APPARATUS WITH PEAK HOLD CIRCUIT FOR GAIN CONTROL SIGNAL

This application is a continuation of prior application, Ser. No. 07/317,925 filed Mar. 2, 1989, now abandoned.

BACKGROUND OF THE INVENTION

1. Field of the Invention

The present invention relates to an optical information processing apparatus which can record information on an optical recording medium, reproduce the information recorded on the optical recording medium, and/or erase the information recorded on the optical recording medium, and more particularly, it relates to a focusing and tracking control circuit thereof.

2. Related Background Art

In the past, as a recording medium on which information is recorded by the use of light and from which recorded information is read-out, various kinds of recording mediums such as disk-shaped, card-shaped, tape-shaped, and the like, have been proposed.

For example, in an optical disk, information is recorded as optically detectable rows of bits (information tracks) by scanning the disk by use of a light beam modulated according to information to be recorded and stopped down to form a minute spot. In this case, in order to correctly record the information without difficulty, such as crossing of the information tracks, it is necessary to control a position on which the light spot is illuminated in a direction perpendicular to a scanning direction in a plane of the optical disk (auto-tracking, referred to a "AT" hereinafter). Further, in order to illuminate the light spot onto the optical disk as a minute spot having stable dimension, regardless of the curvature of the optical disk and/or mechanical errors, it is necessary to control the position of the light spot in a direction perpendicular to the plane of the optical disk (auto-focusing referred to as "AF" hereinafter). In addition, in the reproducing operation, the above-mentioned AT and AF must be considered. While there have been many kinds of such AT and AF techniques proposed in the past, in general, the one that has been utilized is a method in which an objective lens is selectively driven by respective AT and AF actuators in response to a focusing error signal and a tracking error signal on the basis of differences in light intensity in a plurality of light receiving surfaces of focusing and/or tracking photo-detectors which receive the reflected light or transmitted light by the recording medium.

However, in such AT and AF controls, a problem arisen in that malfunction has occurred in a servo system due to variation in the magnitude of such error signals in response to such as, for example, a change in intensity of the light beam illuminated onto the recording medium, or a change in reflection index of the recording medium. In order to solve such a problem, an optical information processing apparatus having a so-called automatic gain control (AGC) circuit for adjusting gain of a focusing control circuit in response to the reflection index of the recording medium has been proposed, as disclosed in the U.S. Pat. No. 4,701,603 and the like. An example of such an AGC circuit is shown in FIG. 1.

Figure 1:
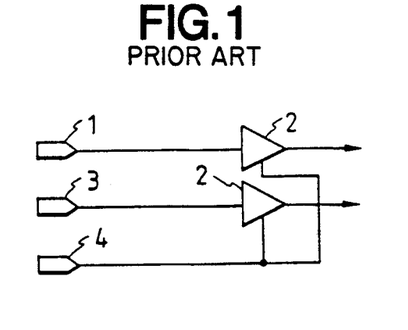
FIG. 1 is a schematic view showing an example of an AGC circuit of a conventional optical information processing apparatus.

In FIG. 1, a reference numeral 1 designates a focusing error signal; 2 designates an AGC circuit for normalizing the focusing error signal and the tracking error signal; 3 designates a tracking error signal; and 4 designates a summation signal of outputs from the aforementioned plurality of light receiving surfaces of the photo-detectors. Here, the AGC circuit 2 can operate in such a manner that, when the summation signal is increased (i.e., the quantity of light from the medium is increased), the gains of the focusing control circuit and/or the tracking control circuit are decreased.

However, in the aforementioned prior optical information processing apparatus, for example, in a tracking seeking condition wherein the AT is operated and the AF is not operated, since the summation signal is modulated each time the track is crossed, a problem arises in that the error signals are not properly normalized, thus presenting an unstable factor in the pull-in of the tracking servo.

SUMMARY OF THE INVENTION

An object of the present invention is to provide an optical information processing apparatus which can eliminate the above-mentioned drawbacks and can always perform stable AT and AF controls.

The above-mentioned object of the present invention is achieved by providing an apparatus for recording information on and/or reproducing information from an optical recording medium by scanning the optical recording medium by the use of a condensed light beam. The apparatus includes:

- adjusting means for adjusting a focusing and/or tracking condition of the light beam;
- error detecting means for detecting a focusing error signal and/or a tracking error signal from light of the light beam reflected or transmitted by the optical recording medium;
- a feedback control circuit for feeding back an output from said error detecting means to said adjusting means;
- light quantity detecting means for detecting light quantity of the reflected or transmitted light;
- gain control means for controlling gain of said feedback control circuit in accordance with the output of said light quantity detecting means; and
- switching means for selectively rendering the output of said light quantity detecting means to a hold condition or a through condition.

BRIEF DESCRIPTION OF THE DRAWINGS

FIGS. 6(a) through 6(g) show wave forms of output signals from each element of the apparatus shown in FIG. 4;

FIGS. 8(a) through 8(g) show wave forms of output signals from each element of the apparatus shown in FIG. 7.

DESCRIPTION OF THE PREFERRED EMBODIMENTS

Figure 2:
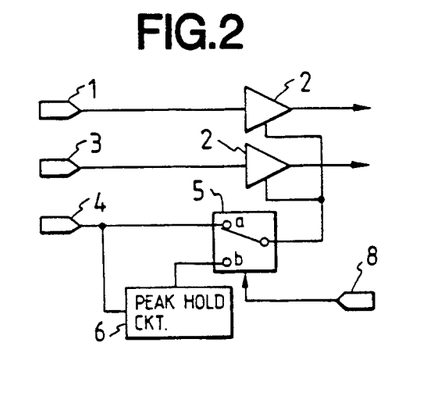
FIG. 2 is a schematic view showing an embodiment of a focusing and tracking control circuit applied to an optical information processing apparatus of the present invention.

FIG. 2 is a circuit diagram showing a characteristic portion of a focusing and/or tracking control circuit applied to an optical information apparatus according to the present invention.

In FIG. 2, reference numeral 1 designates a focusing error signal; 2 designates AGC circuits for normalizing the focusing and tracking error signals, respectively; 3 designates a tracking error signal; 4 designates a summation signal (total sum of outputs from photo-detectors) corresponding to the light quantity of a light beam for detecting the error signals; 5 designates a switch for selecting signals for controlling the AGC circuits 2; 6 designates a peak hold circuit; and 8 designates a signal for controlling the switch 5.

In FIG. 2, when the apparatus is in a recording mode, the signal 8 sent from a system controller of the apparatus connects the switch to its terminal a to render the summation signal 4 sent from the photodetector (not shown) to a through condition. The AGC circuits 2 normalize the error signals 1 and/or 3 in accordance with such a summation signal. On the other hand, when the apparatus is in a reproducing mode, the switch 5 is connected to its terminal b by the signal 8 to render the summation signal 4 to a peak hold condition. The aforementioned track seeking is effected in the reproducing mode, and even if the summation signal varies when the track is crossed, the output from the peak hold circuit 6 does not change as much. Therefore, even in the tracking operation, a stable focusing control can be effected. Further, the pull-in of the tracking using the tracking error signal can also be properly carried out.

Figure 3:
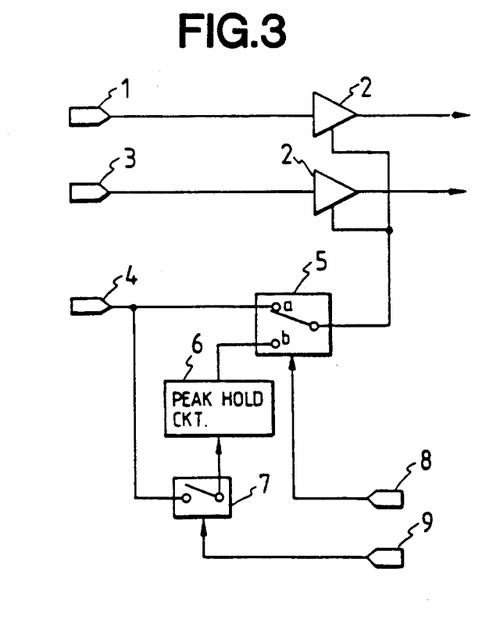
FIG. 3 is a schematic view showing another embodiment of a focusing and tracking control circuit applied to an optical information processing apparatus of the present invention.

FIG. 3 schematically shows another example of the focusing and tracking control circuit applied to the present invention. In FIG. 3, elements corresponding to those of FIG. 2 are indicated by the same reference numerals and the detailed explanation thereof will b omitted.

The FIG. 3 example differs from that of FIG. 2 in that a switch 7 controlled by a signal 9 is provided before the peak hold circuit 6. In the example of FIG. 3, when the apparatus is in the reproducing mode, the switch 5 is connected to the side of the peak hold summation signal(terminal b side) by the AGC control signal 8 and the switch 7 is closed by the AGC control signal 9. If the mode is changed to the erasing mode or the recording mode, the switch 5 is switched to the side of the through summation signal (terminal a side) by the AGC control signal 8 and the switch 7 is opened by the AGC control signal 9.

Subsequently, if the erasing mode or the recording mode is changed to the reproducing mode, the AGC control signals 8 and 9 are inputted to the switches 5 and 7, respectively, with a predetermined delay time after the mode is changed. As a result, the switch 5 is switched to the terminal b and the switch 7 is closed. The above-mentioned delay time is selected to be a short time to the extent that the servo is not disconnected, in consideration of the setting-down time of the laser and the response time of the pre-amplifier for detecting the error signals. By providing such a delay time, it is possible to eliminate a danger of holding the summation signal before the laser power has been completely set down, thus obtaining a mode of stable AT and AF controls during the switching of the modes. In the illustrated circuit example, the switch 5 and switch 7 may be controlled by the same control signal.

Figure 4:
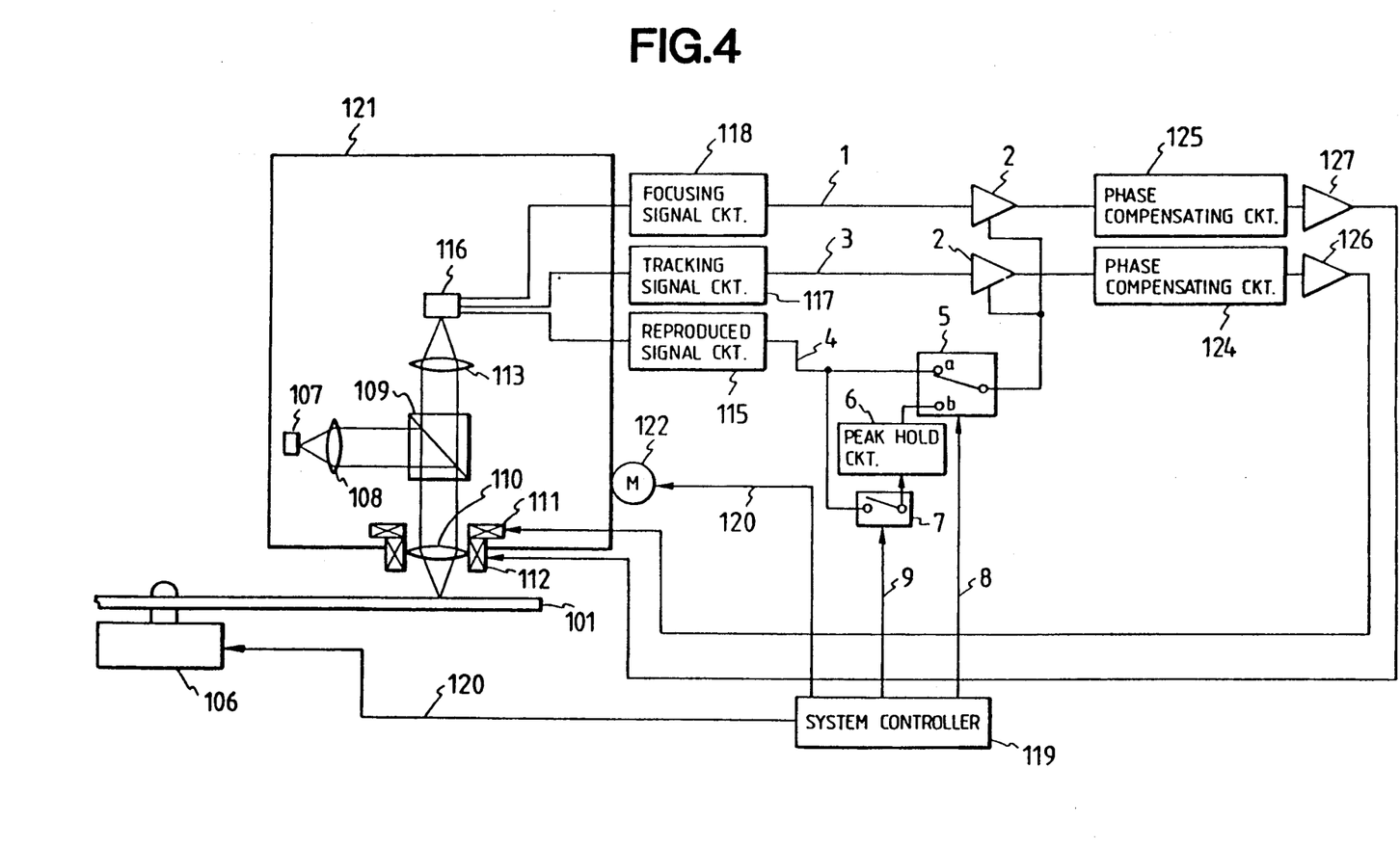
FIG. 4 is a schematic structural view of an optical information processing apparatus incorporating the circuit of FIG. 3 therein.

FIG. 4 shows an example of a construction of the optical information processing apparatus incorporating the circuit of FIG. 3 therein.

In FIG. 4, reference numeral 106 designates a spindle motor for rotating an optical disk 101; 107 designates a light source such as a semiconductor laser; 108 designates a collimator lens for parallelizing light beams from the light source 107; 109 designates a beam slitter; 110 designates an objective lens; 111 designates a tracking coil; 112 designates a focusing coil; 113 designates a condenser lens; 116 designates a photoelectric converter element; 117 designates a tracking signal circuit for obtaining the tracking error signal from a plurality of light receiving surfaces of the photoelectric converter element 116; 118 designates a focusing signal circuit for obtaining the focusing error signal from a plurality of light receiving surfaces of the photoelectric converter element 116; and 115 designates a reproduced signal circuit for obtaining the aforementioned summation signal. Further, reference numerals 124 and 125 designate phase compensating circuits, respectively; and 126 and 127 designate amplifiers, respectively. Furthermore, reference numeral 119 designates a system controller for controlling the recording and/or reproducing apparatus; reference numerals 8 and 9 designate the aforementioned AGC control signals, respectively; and reference numeral 120 designates a group of various control signals outputted from the system controller 119. Incidentally, although signals other than the control signals 120 are outputted from the system controller 119, such other signals are not shown herein. Lastly, reference numeral 121 designates an optical head; and 122 designates a driving motor for shifting the optical head 121 in a radial direction of the optical disk 101.

The light beams emitted from the light source 107 are changed to parallel beams by means of the collimator lens 108 and reach the beam splitter 109. The light beams from the beam splitter are condensed on the recording track formed on the optical disk 101 by the objective lens 110. The light beams reflected by the recording track are transmitted through the beam splitter 109 and then are condensed on the photoelectric converter element 116 through the condenser lens 113. The signal obtained by the photoelectric converter element 116 are sent to the tracking signal circuit 117 and the focusing signal circuit 118, respectively, so as to obtain the tracking error signal and the focusing error signal and these error signals are sent to the circuit shown in FIG. 3. The signals emitted from the circuit of FIG. 3 are inputted to the tracking coil 111 and focusing coil 112 through the phase compensating circuits 124, 125 for stabilizing the AT servo, and AF servo and through the amplifiers 126, 127, respectively. And, on the basis of these signals, the AT and AF controls are performed by moving the objective lens 110 in the direction perpendicular to the optical axis thereof and in the direction of the optical axis.

Figure 5:
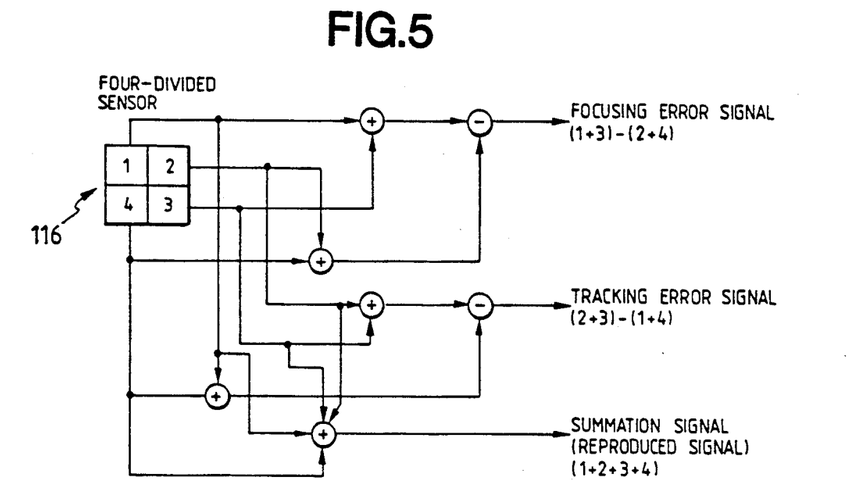
FIG. 5 is a detailed construction of the focusing and tracking control circuit of FIG. 4.

The light receiving surface of the photodetector or photo-sensor 116 is divided into four, and each of the circuits in FIG. 4 are embodied, for example, as shown in FIG. 5. Such signal detecting techniques are fully described in the U.S. Pat. Nos. 4,079,247 and 4,410,969.

Figure 6A:
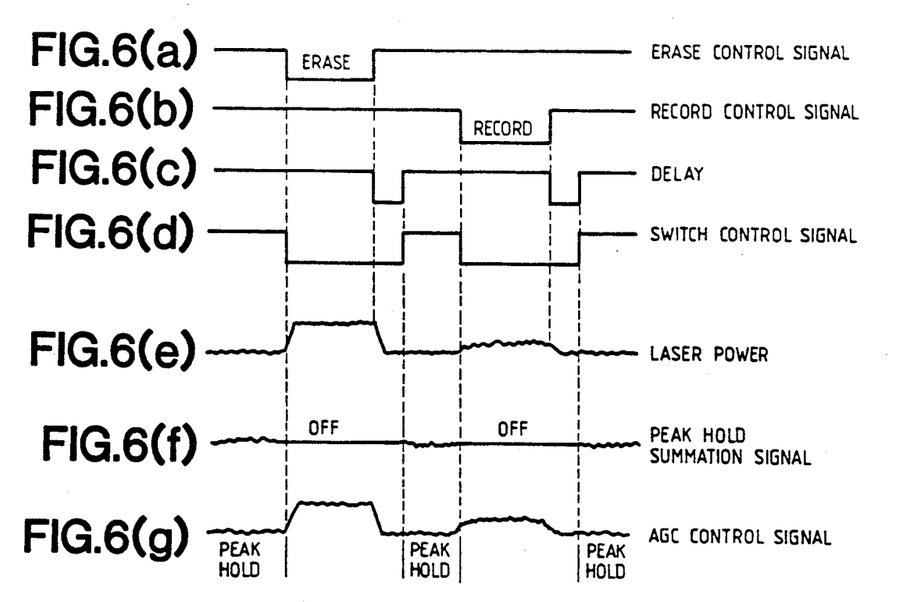

FIGS. 6(a) through 6(g) show wave forms of the signals emitted from various elements of the apparatus of FIG. 4. In those figures, FIG. 6(a) designates an erase control signal, FIG. 6(b) designates a record control signal, FIG. 6(c) designates the aforementioned delay signal, FIG. 6(d) designates a switch control signal, FIG. 6(e) designates a laser power, FIG. 6(f) designates a peak hold summation signal, and FIG. 6(g) designates an AGC control signal. Next, the operation of the optical information processing apparatus of FIG. 4 will be explained in connection with FIGS. 6(a) through 6(g). At first, when the reproducing mode is changed to the erasing mode, the signal such as FIG. 6(a) is emitted from the system controller 119 and the laser power of the light source 107 is increased as shown in FIG. 6(e). Further, the switch control signals 8 and 9 are changed to a LOW level as shown in FIG. 6(d) to render the AGC control signal to the through condition. Consequently, the signal inputted to the AGC circuit 2 is also increased as shown in FIG. 6(g).

Next, when the erasing mode is changed to the reproducing mode, the erase control signal FIG. 6(a) is changed to a HIGH level and the laser power is decreased as shown in FIG. 6(e). The switch control signal FIG. 6(d) is delayed with respect to the signal FIG. 6(a) by a time corresponding to the delay signal FIG. 6(c) and thereafter, is changed to a HIGH level, by which the switch 5 is switched toward the terminal b and the switch 7 is closed. Thus, the AGC control signal is in the peak hold condition as shown in FIG. 6(g). A similar operation is effected when the reproducing mode is changed to the recording mode and when the recording mod is changed to the reproducing mode.

Figure 7:
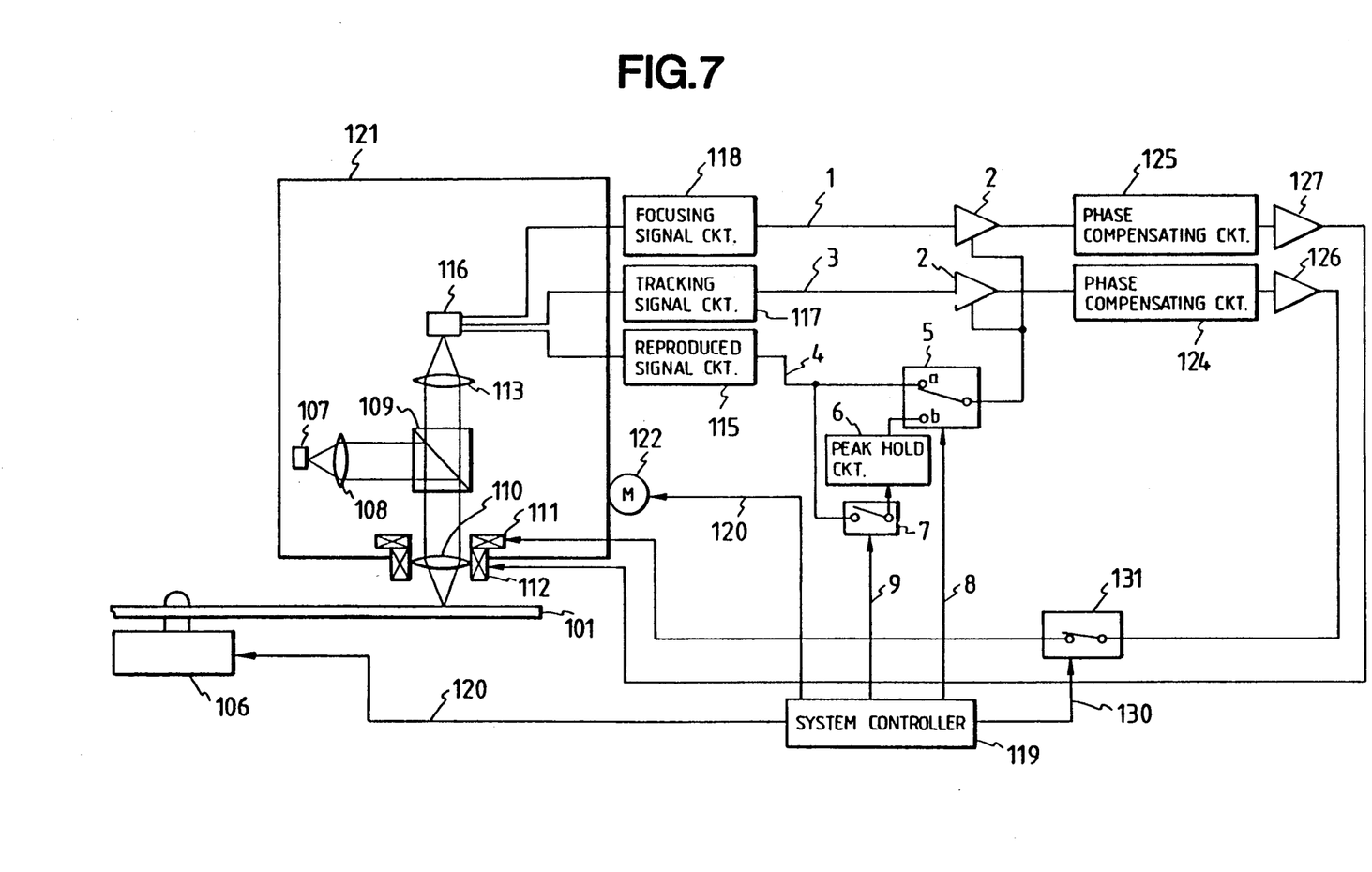
FIG. 7 is a schematic structural view of an optical information processing apparatus according to another embodiment of the present invention.

FIG. 7 schematically shows another embodiment of the optical information processing apparatus. In FIG. 7, elements corresponding to those of FIG. 4 are indicated by the same reference numerals and detailed explanation thereof will be omitted.

This embodiment differs from that of FIG. 4 that the apparatus further includes a switch 131 for turning the tracking servo ON or OFF. The switch 131 is controlled by a signal 130 outputted from the system controller 119. The record, reproduce and erase control signals are used as the control signal 9. The switch 7 is controlled to close in the reproducing mode and to open in the recording and erasing modes. As the control signal 8, the signal when the tracking servo is adequately stabilized is used. That is to say, the control signal 8 is sent to the switch 5 with the predetermined delay time after the switch 131 is closed, whereby the switch 5 is switched toward the peak hold condition (terminal b) when the tracking servo is turned OFF and when the tracking servo is pulled-in, and is switched toward the through condition (terminal a) when the tracking servo is stabilized.

Figures 8A, 8G:
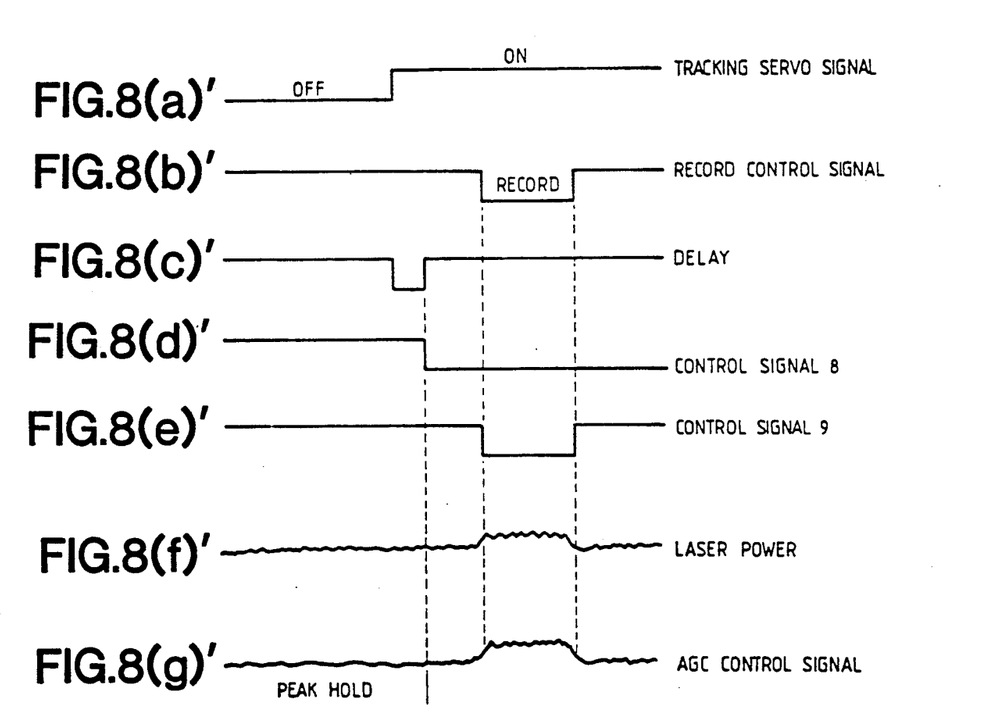

FIGS. 8(a)' through 8(g)' show wave forms of the signals emitted from various elements of the apparatus of FIG. 7. In those figures FIG. 8, (a)' designates a tracking servo, signal, FIG. 8(b)' designates a record control, signal, FIG. 8(c)' designates a delay signal, FIG. 8(d)' designates a switch control signal FIG. 8(e)' designates a switch control signal 9, FIG. 8(f)' designates laser power, and FIG. 8(g)' designates an AGC control signal.

The present invention is not limited to the illustrated embodiment, but can be modified or altered in various ways. For example, the quantity of light from the medium can be obtained by another detector, in place of the summation signal from the abovementioned error signal photo-detector. More concretely, a part of the reflected light beam directed from the medium to the error signal photo-detector may be divided so as to be received in a photoelectric converter element for detecting light quantity. Further, when the recording medium is of the light transmitting type, all of the above-mentioned error signals and light quantity detecting signal can be detected from the light passed through the medium.

The present invention includes all modifications and alterations such as the above, without departing from the scope of the appended claims.

What is claimed is:

1. An apparatus for recording information on and/or reproducing information from an optical recording medium by scanning the optical recording medium with a condensed light beam, said apparatus comprising:

adjusting means for adjusting a focusing and/or a tracking condition of the light beam;

error detecting means for detecting a focusing error signal and/or a tracking error signal from light of the light beam reflected or transmitted by the optical recording medium;

a feedback control circuit for feeding an output from said error detecting means back to said adjusting means;

light quantity detecting means for detecting light quantity of the reflected or transmitted light;

gain control means for controlling gain of said feedback control circuit;

holding means for holding an output of said light quantity detecting means; and selecting means for selecting one of the output of said light quantity detecting means which has been held by said holding means and an output of said light quantity detecting means which has not been held by said holding means, according to a predetermined condition;

wherein said gain control means controls the gain of said feedback control circuit in accordance with the output of said light quantity detecting means selected by said selecting means.

2. An apparatus according to claim 1, wherein said apparatus comprises means for selectively recording and reproducing the information, and said selecting means comprises means for selecting the output of said light quantity means which has not been held by said holding means, during recording, and means for selecting the output of said light quantity detecting means which has been held by said holding means, during reproducing.

3. An apparatus according to claim 2, wherein said selecting means further comprises means for shifting the output of said light quantity detecting means from the output which has not been held by said holding means to the output which has been held by said holding means, with a predetermined delay time after recording changes to reproducing.

4. An apparatus according to claim 2, wherein said apparatus further comprises means for erasing the information recorded on the optical recording medium, and said selecting means further comprises means for selecting the output of said light quantity detecting means which has not been held by said holding means, during erasing.

5. An apparatus according to claim 4, wherein said selecting means further comprises means for shifting the output of said light quantity detecting means from the output which has not been held by said holding means to the output which has been held by said holding means, with a predetermined delay time after erasing changes to reproducing.

6. An apparatus according to claim 1, wherein said error detecting means comprises a photoelectric converter element having a plurality of divided light receiving surfaces, and a circuit for differentiating outputs from said light receiving surfaces from one another.

7. An apparatus according to claim 6, wherein said light quantity detecting means comprises a circuit for adding the output of said light receiving surfaces of said photoelectric converter element.

8. An apparatus according to claim 1, wherein said holding means comprises a peak hold circuit.

9. An apparatus according to claim 1, further comprising switching means for connecting or disconnecting an input from said light quantity detecting means to said holding means.

10. An apparatus according to claim 1, further comprising an optical system for condensing the light beam on the optical recording medium, and wherein said adjusting means comprises an actuator for driving at least a portion of said optical system.

11. An apparatus for recording information on and/or reproducing information from an optical recording medium by scanning the optical recording medium with a condensed light beam, said apparatus comprising:
focusing adjusting means for adjusting a focusing condition for the light beam;
focusing error detecting means for detecting a focusing error signal from light of the light beam reflected or transmitted by the optical recording medium;
a focusing control circuit for feeding an output from said focusing error detecting means back to said focusing adjusting means;
tracking adjusting means for adjusting a tracking condition of the light beam;
tracking error detecting means for detecting a tracking error signal from light of the light beam reflected or transmitted by the optical recording medium;
a tracking control circuit for feeding an output from said tracking error detecting means back to said tracking adjusting means;
first switching means for selectively rendering said tracking control circuit to one of an operative condition and an inoperative condition;
light quantity detecting means for detecting light quantity of the reflected or transmitted light;
gain control means for controlling gain of said focusing and/or tracking control circuits in accordance with the output of said light quantity detecting means;
holding means for holding an output of said light quantity detecting means; and
second switching means for selecting one of the output of said light quantity detecting means which has been held by said holding means and an output of said light quantity detecting means which has not held by said holding means, corresponding to the operative condition and the inoperative condition of said tracking control circuit;
wherein said gain control means controls the gain of said feedback control circuit in accordance with the output of said light quantity detecting means selected by said second switching means.

12. An apparatus according to claim 11, wherein said second switching means comprises means for shifting the output of said light quantity detecting means from the output which has been held by said holding means to the output which has not been held by said holding means, with a predetermined delay time after said tracking control circuit changes from the inoperative condition to the operative condition.

13. An apparatus according to claim 11, wherein said focusing error detecting means and said tracking error detecting means comprises a photoelectric converter element having a plurality of divided light receiving surfaces, and a circuit for differentiating outputs from said light receiving surfaces from one another.

14. An apparatus according to claim 13, wherein said light quantity detecting means comprises a circuit for adding the outputs of said light receiving surfaces of said photoelectric converter element.

15. An apparatus according to claim 11, wherein said holding means comprises a peak hold circuit.

16. An apparatus according to claim 15, further comprising third switching means for connecting or disconnecting an input from said light quantity detecting means to said holding means.

17. An apparatus according to claim 11, further comprising an optical system for condensing the light beam on the optical recording medium, and wherein at least one of said focusing adjusting means and said tracking adjusting means comprises an actuator for driving at least a portion of said optical system.

18. An optical information processing apparatus comprising:
a light source for emitting a light beam;
an optical system for condensing the light beam emitted from said light source on an optical recording medium;
an actuator for driving at least a portion of said optical system to change focusing and/or tracking conditions of the light beam;
an error detector for detecting a focusing and/or a tracking error signal from light of the light beam reflected or transmitted by the optical recording medium;
a feedback control circuit for feeding an output from said error detector back to said actuator;
a light quantity detector for detecting light quantity of the reflected or transmitted light;
a gain control circuit for controlling gain of said feedback control circuit in accordance with an output of said light quantity detector;
a holding circuit for holding an output of said light quantity detector; and
a selecting circuit for selecting one of the output of said light quantity detector which has been held by said holding circuit and an output of said light quantity detector which has not held by said holding circuit, corresponding to a predetermined condition;
wherein said gain control circuit controls the gain of said feedback control circuit in accordance with the output of said light quantity detector selected by said selecting circuit.

19. An apparatus according to claim 18, wherein said apparatus further comprises means for selectively recording and reproducing the information, and said selecting circuit comprises means for selecting the output of said light quantity detector which has not been held during recording and for selecting the output of said light quantity detector which has been held, during reproducing.

20. An apparatus according to claim 19, wherein said selecting circuit further comprises means for shifting the output of said light quantity detector from the output which has not been held by said holding circuit to the output which has been held by said holding circuit, with a predetermined delay time after recording changes to reproducing.

21. An apparatus according to claim 19, wherein said apparatus further comprises means for erasing the information recorded on said optical recording medium, and said selecting circuit further comprises means for selecting the output of said light quantity detector which has not been held by said holding circuit, during erasing.

22. An apparatus according to claim 21, wherein said selecting circuit further comprises means for shifting the output which has not been held by said holding circuit to the output which has been held by said holding circuit, with a predetermined delay time after erasing changes to reproducing.

23. An apparatus according to claim 18, wherein said error detector comprises a photoelectric converter element having a plurality of divided light receiving surfaces, and a circuit for differentiating outputs from said light receiving surfaces from one another.

24. An apparatus according to claim 23, wherein said light quantity detector comprises a circuit for adding the outputs of said light receiving surfaces of said photoelectric converter element.

25. An apparatus according to claim 18, wherein said holding circuit comprises means for holding a peak value of the output of said light quantity detector.

26. An apparatus according to claim 18, further comprising a switch for connecting or disconnecting an input from said light quantity detector to said holding circuit.

27. An optical information processing apparatus comprising:
- a light source for emitting a light beam;
- an optical system for condensing the light beam emitted from said light source on an optical recording medium;
- a focusing actuator for driving at least a portion of said optical system to change a focusing condition of the light beam;
- a focusing error detector for detecting a focusing error signal from light of the light beam reflected or transmitted by the optical recording medium;
- a focusing control circuit for feeding an output from said error detector back to said focusing actuator;
- a tracking actuator for driving at least a portion of said optical system to change a tracking condition of the light beam;
- a tracking error detector for detecting a tracking error signal from light of the light beam reflected or transmitted by the optical recording medium;
- a tracking control circuit for feeding an output from said tracking error detector back to said tracking actuator;
- a first switching circuit for selectively rendering said tracking control circuit to one of an operative condition and an inoperative condition;
- a light quantity detector for detecting light quantity of the reflected or transmitted light;
- a gain control circuit for controlling gain of said focusing and/or tracking control circuits in accordance with an output of said light quantity detector;
- a holding circuit for holding an output of said light quantity detector; and
- a second switching circuit for selecting one of the output of said light quantity detector which has been held by said holding circuit and an output of said light quantity detector which has not held by said holding circuit, corresponding to the operative condition and the inoperative condition of said tracking control circuit;
- wherein said gain control circuit controls the gain of said feedback control circuit in accordance with the output of said light quantity detector selected by said second switching circuit.

28. An apparatus according to claim 27, wherein said second switching circuit comprises means for shifting the output of said light quantity detector from the output which has been held by said holding circuit to the output which has not been held by said holding circuit, with a predetermined delay time after said tracking control circuit changes from the inoperative condition to the operative condition.

29. An apparatus according to claim 27, wherein said focusing error detector and said tracking error detector comprise a photoelectric converter element having a plurality of divided light receiving surfaces, and a circuit for differentiating outputs from said light receiving surfaces from one another.

30. An apparatus according to claim 29, wherein said light quantity detector comprises a circuit for adding the outputs of said light receiving surfaces of said photoelectric converter element.

31. An apparatus according to claim 27, wherein said holding circuit comprises means for holding a peak value of the output of said light quantity detector.

32. An apparatus according to claim 31, further comprising a third switching circuit for connecting or disconnecting an input from said light quantity detector to said holding circuit.

33. An apparatus for recording information on and/or reproducing information from an optical recording medium having a plurality of tracks by scanning a desired track on the optical recording medium with a condensed light beam, said apparatus comprising:
- adjusting means for adjusting a focusing and/or tracking condition of the light beam;
- error detecting means for detecting a focusing error signal and/or a tracking error signal from light of the light beam reflected or transmitted by the optical recording medium;
- a feedback control circuit for feeding an output from said error detecting means back to said adjusting means;
- light quantity detecting means for detecting light quantity of the reflected or transmitted light, and for producing a detection result;
- gain control means for controlling gain of said feedback control circuit in accordance with the detection result produced by said light quantity detecting means; and
- seeking means for moving the light beam to the desired track on the recording medium;
- wherein said gain control means prohibits control of the gain of the feedback control circuit in accordance with a detection result of the light quantity detecting means during movement of the light beam for track seeking by said seeking means.

* * * * *

UNITED STATES PATENT AND TRADEMARK OFFICE
CERTIFICATE OF CORRECTION

PATENT NO. : 5,107,101            Page 1 of 3
DATED : April 21, 1992
INVENTOR(S) : Hirotake Ando It is certified that error appears in the above-identified patent and that said Letters Patent is hereby corrected as shown below:

On the title page item [56]

UNDER REFERENCES CITED

The following should be inserted:

--FOREIGN PATENT DOCUMENTS

```
0095766    12/1983  EPA
3,346,114  7/1984   Fed. Rep. of Germany
60-22745   2/1985   Japan--.
```

COLUMN 1

Line 36, "dimension," should read --dimensions,--;
Line 40, "(auto-focusing" should read --(auto-focusing,--; and
Line 66, "a" (first occurrence) should be deleted.

UNITED STATES PATENT AND TRADEMARK OFFICE
CERTIFICATE OF CORRECTION

PATENT NO. : 5,107,101

DATED : April 21, 1992

INVENTOR(S) : Hirotake Ando

It is certified that error appears in the above-identified patent and that said Letters Patent is hereby corrected as shown below:

COLUMN 3

Line 45, "b" should read --be--; and
Line 52, "signal(terminal" should read --signal (terminal--.

COLUMN 4

Line 15, "slitter;" should read --splitter;--; and
Line 60, "servo, and AF servo" should read --servo and AF servo,--.

COLUMN 5

Line 35, "mod" should read --mode--;
Line 41, "Fig. 4" should read --Fig. 4 in--;
Line 60, "figures Fig. 8, (a)'" should read --figures, Fig. 8(a)'--;
Line 62, "control," should read --control--; and
Line 63, "signal" should read --signal,--.

UNITED STATES PATENT AND TRADEMARK OFFICE
CERTIFICATE OF CORRECTION

PATENT NO. : 5,107,101

DATED : April 21, 1992

INVENTOR(S) : Hirotake Ando

It is certified that error appears in the above-identified patent and that said Letters Patent is hereby corrected as shown below:

<u>COLUMN 6</u>

Line 11, "signal" should read --signals--.

<u>COLUMN 7</u>

Line 66, "not" should read --not been--.

Signed and Sealed this

Twenty-fourth Day of August, 1993

Attest:

BRUCE LEHMAN

*Attesting Officer*     *Commissioner of Patents and Trademarks*